(12) United States Patent
Bortolin et al.

(10) Patent No.: US 8,571,926 B2
(45) Date of Patent: *Oct. 29, 2013

(54) SYSTEM AND APPARATUS FOR LINKING MULTIPLE REWARDS PROGRAMS TO PROMOTE THE PURCHASE OF SPECIFIC PRODUCT MIXES

(75) Inventors: Corinne Bortolin, Half Moon Bay, CA (US); Loc Nguyen, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,478

(22) Filed: Aug. 3, 2012

(65) Prior Publication Data

US 2013/0018706 A1 Jan. 17, 2013

Related U.S. Application Data

(63) Continuation of application No. 10/676,382, filed on Sep. 30, 2003, now Pat. No. 8,260,661.

(51) Int. Cl.
*G06Q 30/00* (2012.01)

(52) U.S. Cl.
USPC .......................................................... 705/14.1

(58) Field of Classification Search
USPC .......................................................... 705/14.1
See application file for complete search history.

(56) References Cited

U.S. PATENT DOCUMENTS

| | | | |
|---|---|---|---|
| 5,465,206 A | 11/1995 | Hilt et al. | |
| 5,477,038 A | 12/1995 | Levinr et al. | |
| 5,530,232 A | 6/1996 | Taylor | |
| 5,621,201 A | 4/1997 | Langhans et al. | |
| 6,055,512 A | 4/2000 | Dean et al. | |
| 6,101,477 A | 8/2000 | Hohle et al. | |
| 6,247,129 B1 | 6/2001 | Keathley et al. | |
| 6,560,581 B1 | 5/2003 | Fox et al. | |
| 6,571,216 B1 | 5/2003 | Garg et al. | |
| 6,594,640 B1 | 7/2003 | Postrel | |
| 8,260,661 B2 * | 9/2012 | Bortolin et al. | 705/14.1 |
| 2001/0016827 A1 | 8/2001 | Fernandez | |
| 2001/0054003 A1 | 12/2001 | Chien et al. | |
| 2002/0026348 A1 | 2/2002 | Fowler et al. | |
| 2003/0212626 A1 | 11/2003 | Vulkan | |
| 2004/0148224 A1 | 7/2004 | Gauthier et al. | |
| 2005/0055272 A1 | 3/2005 | Ryan et al. | |

OTHER PUBLICATIONS

International Search Report and Written Opinion of International Application No. PCT/US2004/030337, mailed Nov. 4, 2005, 8 pages.

Nerger, M., "Evening the odds: CRM systems are driving sophisticated loyalty programs at Las Vegas Casinos—and not just for the high rollers.", Mar. 1, 2002, 7 pages.

* cited by examiner

*Primary Examiner* — Daniel Lastra (74) *Attorney, Agent, or Firm* — Kilpatrick Townsend & Stockton LLP (57) ABSTRACT

A method and system for linking multiple pre-existing reward programs is disclosed. The method includes receiving information about a first pre-existing reward program for a first product, where the first reward program provides for a first reward, and receiving information about a second pre-existing reward program for a second product, wherein the second reward program provides a second reward. A combination reward program is provided, and the combination reward program provides a combination reward that is greater than each of the first reward and the second reward.

26 Claims, 6 Drawing Sheets

SYSTEM AND APPARATUS FOR LINKING MULTIPLE REWARDS PROGRAMS TO PROMOTE THE PURCHASE OF SPECIFIC PRODUCT MIXES

CROSS-REFERENCES TO RELATED APPLICATIONS

This application is a continuation of U.S. patent application Ser. No. 10/676,382, filed Sep. 30, 2003, entitled "SYSTEM AND APPARATUS FOR LINKING MULTIPLE REWARDS PROGRAMS TO PROMOTE THE PURCHASE OF SPECIFIC PRODUCT MIXES", the disclosure of which is hereby incorporated by reference in its entirety for all purposes.

BACKGROUND OF THE INVENTION

In today's environment, marketing programs are targeted at consumers and the value propositions associated with them are primarily singular. That is, known marketing programs are tailored towards individual products and provide for specific rewards tied to specific products. For example, a store's marketing program may provide for a reward of $0.25 after the consumer purchases a particular brand of toothpaste. Thus, many individual, discrete programs are deployed and targeted at various consumer market segments. Each program is managed individually (as opposed to campaign-wide).

The effectiveness of such individual programs is limited. For example, individual Retailer H may have a program for marketing Beer X, while Retailer I may have a program for marketing Nuts Y. Retailer H may provide a $0.50 reward for the purchase of each Beer X and Retailer I may provide a $0.50 reward for the purchase of each Nuts Y. Retailer H and Retailer I have maximized the potential sales for Beer X and Nuts Y with these individual marketing programs.

It would be desirable if there could be a way to increase the synergy between existing marketing programs (like the ones described above). It would also be desirable to increase sales by leveraging pre-existing marketing programs.

Embodiments of the invention address these and other problems.

SUMMARY OF THE INVENTION

Embodiments of the invention allow for multiple pre-existing reward programs with respective pre-existing reward triggers to be linked together to form a new combination reward program with a new reward trigger. The new combination reward can be greater in value than each individual reward in each individual program. Embodiments of the invention enable merchants to "bundle" programs already in existence. That is, they can re-package the marketing programs that they already have in order to further increase sales.

Merchants are willing to bundle programs and accept decreased margins in return for higher total sales volumes. Consumers who purchase products through the combination program can receive incrementally higher rewards than by purchasing products through separate reward programs so that consumers also benefit from embodiments of the invention.

In some embodiments, the combination reward program can be embodied by a single application or set of software components (which may be part of a system) residing within an acceptance device at an acceptance point. This provides the means for an electronic reward sponsor and/or merchant to encourage consumer purchases involving a specified mix or combination of programs.

The linking process according to embodiments of the invention facilitates cross-merchant pollination, and increased sales. The application can be extended to programs belonging to different merchants. For example, in the example described in the Background of the Invention section above, Retailers H and I could effectively increase their sales by "linking" their programs together. For example, a new enhanced trigger of buying 2 Beer Xs and 2 Nuts Y would result in a greater reward of an additional $1 off addition to the $2 (for a total reward of $3) that would have been rewarded had the products been individually purchased. Advantageously, Retailers H and I need not modify their existing programs, and can still expect to see increased sales, because their programs are linked together. A number of more specific examples are provided below.

One embodiment of the invention is directed to a method comprising: (a) receiving information about a first reward program for a first product, wherein the first pre-existing reward program provides for a first reward; (b) receiving information about a second pre-existing reward program for a second product, wherein the second reward program provides a second reward; and (c) providing for a combination reward program that provides a combination reward that is based on at least the purchase of the first product and the second product, and wherein the combination reward is greater than each of the first reward and the second reward.

Another embodiment of the invention is directed to a computer readable medium comprising: (a) code for receiving information about a first pre-existing reward program for a first product, wherein the first reward program provides for a first reward; (b) code for providing for receiving information about a second pre-existing reward program for a second product, wherein the second reward program provides a second reward; and (c) code for providing for a combination reward program that provides a combination reward that is based on at least the purchase of the first product and the second product, and wherein the combination reward is greater than each of the first reward and the second reward.

These and other embodiments of the invention are described in further detail below with reference to the Figures.

DETAILED DESCRIPTION

Embodiments of the invention can be used in a variety of different ways, and by a variety of different entities.

Embodiments of the invention can be used in retail merchant and service organization payment systems (that may include acceptance points) that interface to a portable consumer device in the context of a transaction where the consumer is provided with variable incentives (e.g., "rewards") when specific purchase behaviors are performed.

Embodiments of the invention can be used when a consumer may purchase one or more products (goods or services), invoking a discount on the purchase price or other type incentive or where the consumer may make purchases at multiple locations of a single merchant/service organization or several merchant/service organizations and receives incentives for completing these purchases in a specific manner or in any number of predetermined alternative ways.

Embodiments of the invention can be used when the interface between the portable consumer device and the acceptance device at the acceptance point is desirably performed offline and, accordingly, data elements needed to calculate and record reward accumulations and redemptions are stored within an internal memory of the portable consumer device.

Embodiments of the invention can be used where the sponsor of a specific electronic reward or the operator of one or more acceptance points can define the rules associated with the accumulation and/or redemption of such rewards. The rules may include, but are not limited to loyalty purchase linkages that are dependent on the purchase of one or more specific products or services. The rules may also potentially exclude the purchases of other specific products or services. When such purchases are completed according to one or more of the rules, rewards associated with purchases of other specific products or services or at other merchants and/or locations may be triggered. Such rewards may be designed to provide incentives to the consumer to purchase, consume, and/or utilize at least two different products (e.g., goods and/or services), at two different locations and/or merchants in a predetermined order, quantity or mix.

Embodiments of the invention can be used where existing smart card-based, offline loyalty programs link the accumulation and redemption of rewards to the purchase of a single product/service, product/service group, merchant, or merchant group and cannot require or offer discounts on purchases of other product/service(s) or from other merchants or merchant locations. Such restrictions prevent the creation of programs that link purchases of specific products and/or services to the purchase of other products and/or services and/or to specific locations or merchants. The restrictions prevent the creation of programs that link rewards to purchases of multiple products/services/locations in specific quantities, in a particular sequence, and/or over a specific time period together.

Embodiments of the invention can be used in existing offline loyalty systems. In existing offline loyalty systems, merchants and reward sponsors want to have the ability to create such reward programs in order to support and enhance their complex marketing strategies and to provide incentives to consumers to perform certain increasingly complex purchase behaviors that link products, services, purchase locations, purchase sequences, and time periods in a mix according to the reward sponsor's choice.

As will be apparent from the various examples provided below, embodiments of the invention have a number of advantages. First, embodiments of the invention enable a rewards sponsor (e.g., a host organization such as a credit or debit card company) to establish rewards programs that encourage distinct purchasing behaviors and promote the purchase of specific products and the utilization of specific merchant locations or merchants in order to support a broader marketing strategy. This elevates the marketing precision from programs to campaigns, from products to product lines, and/or from single merchants to a network of merchants. Second, embodiments of the invention also advantageously allow for the re-use of existing programs. They enable a host organization such as a credit, debit and/or smart card issuer to capitalize on existing programs. That is, existing programs can be used to spawn an entirely new inventory of programs from pre-existing components.

Embodiments of the invention are directed to methods and systems that link pre-existing reward programs together to provide enhanced combination rewards. The methods and systems can be used in any suitable environment. For example, embodiments of the invention can be used in retail merchant and service organization payment systems that include a number of "acceptance points." Each acceptance point may accept a portable consumer device such as a smart card. An acceptance point may be a "point of sale" (POS). A point of sale can be a point where a consumer uses the portable consumer device to purchase a good or service. Examples of points of sale include cash registers at stores or restaurants, as well as home computer terminals with access devices that can read and write data to a portable consumer device.

Figure 1:
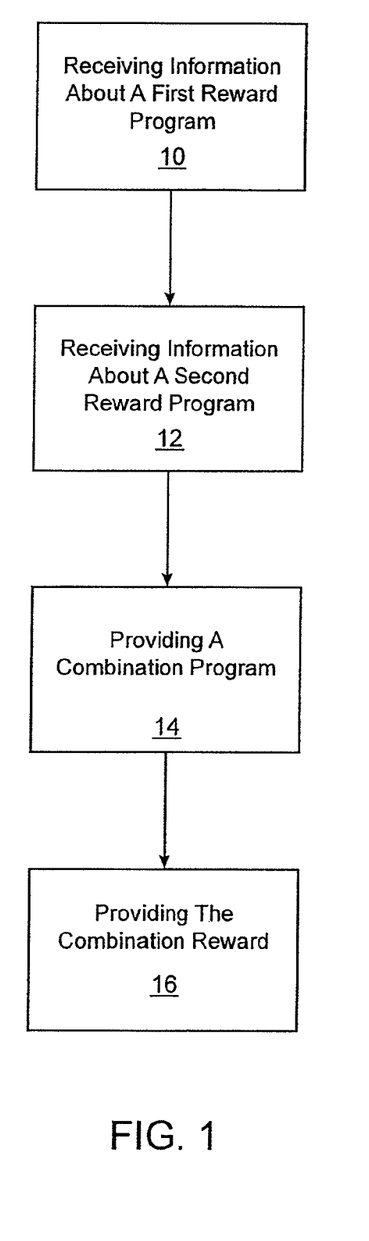
FIG. 1 shows a flowchart according to an embodiment of the invention.

A method according to an embodiment of the invention is shown in FIG. 1. As shown in FIG. 1, a host organization (or merchant) such as a reward sponsor can receive information about a first reward program (step 10). The first reward program can be a first pre-existing reward program for a first product, where the first reward program provides for a first reward. Before or after this step, the host organization (or merchant) may receive information about a second reward program (step 12). The second reward program can be a second pre-existing reward program for a second product, where the second reward program provides for a second reward.

The "products" according to embodiments of the invention may include any number of goods and services. Exemplary goods include ordinary household goods, food items, toys, gifts, etc. Exemplary services includes services such as dining, dry cleaning, hotel services, etc.

Information about the first reward program and the second reward program can be obtained in any suitable manner. For example, in some embodiments, information about the first reward program and the second reward program may be obtained from different merchants electronically, and can be received at a server computer in the host system operated by a host organization. Alternatively, the first and second reward programs may originate from the same organization that creates the combination reward program. The host organization's server computer may then create the combination reward program using the information about the first reward program and the second reward program.

Although a first product and a corresponding first reward program, and a second product and a corresponding second reward program are discussed in detail in this application, it is understood that embodiments of the invention can be extended to an additional third product with a corresponding third reward program that provides for a third reward, an additional fourth product that corresponds to a fourth reward program that provides for a fourth reward, etc. Any suitable number or combination of programs can be used to form the combination reward program.

In some embodiments, the first product may be made by or serviced by a first manufacturer, retailer, or service provider, while the second product may be made by or serviced by a second manufacturer, retailer, or service provider (different than the first manufacturer or service provider). Enhanced rewards can be provided, even though the different products come from different manufacturers, retailers, and/or service providers. In one example, the first, second, third, etc. products can be made by different manufacturers, but can be sold by the same merchant. In another example, first, second, and third, etc. products can be sold by different merchants, but can be made by the same manufacturer. In some embodiments, the user of a portable consumer device can receive a combination reward even if the user purchases products at different merchants within a predetermined period of time.

Using the information in steps 10 and 12, a combination reward program that provides a combination reward can be provided (step 14). Typically, a host organization such as a credit, debit, or smart card issuer can provide the combination reward program and the combination reward. However, in other embodiments, a merchant that sells a particular product, or even the originator of the product (e.g., a manufacturer), can provide the combination reward program and the combination reward for the consumer.

For each combination reward program, different pre-existing programs can be linked together in any suitable manner. The linking process facilitates reward accumulation and redemption triggers using linking functions (e.g., "and", "or", "not", "not(and nor or)") at the intersections of the pre-existing programs. New triggers and rewards can be specified for each intersection of programs to spawn entirely new programs. This is shown in the examples below. At each intersection, the value of the reward grows proportionately larger (benefits the consumer), while the minimum trigger amounts/quantity purchased also increase (benefits the merchant).

Preferably, the value of the combination reward may be greater than the value of each individual reward by any suitable amount. For example, in some embodiments, the combination reward may be 10, 20, 50, or even 100 percent greater in value than each individual reward associated with each individual reward program used to form the combination reward program. Also, the combination reward may be the same or different type than the individual rewards. For example, the combination reward may be a reward based on time, whereas the individual rewards may be based on dollar value.

As noted above, the increased trigger for the combination reward may be greater than the trigger of each individual reward. In some embodiments, the increased trigger for the combination reward may be the purchase of two products, instead of a trigger of the purchase of one product in an individual program. The reward triggers may be set by the entity creating the combination reward program.

The combination reward program (as well as the pre-existing programs used to form the combination reward program) may be embodied as computer code which can be stored on a computer readable medium, and it may be created automatically by a computer. Consequently, the combination reward program and the receipt of information about the various pre-existing reward programs used to form the combination reward program can be run on one or more digital computers in some embodiments of the invention. The computer readable medium can be present in the above described access device, server computer, or portable consumer device. The computer readable medium containing code for the combination reward program preferably resides on at least the access device. Access devices, server computers, and portable consumer devices are described in further detail below.

Figure 2:
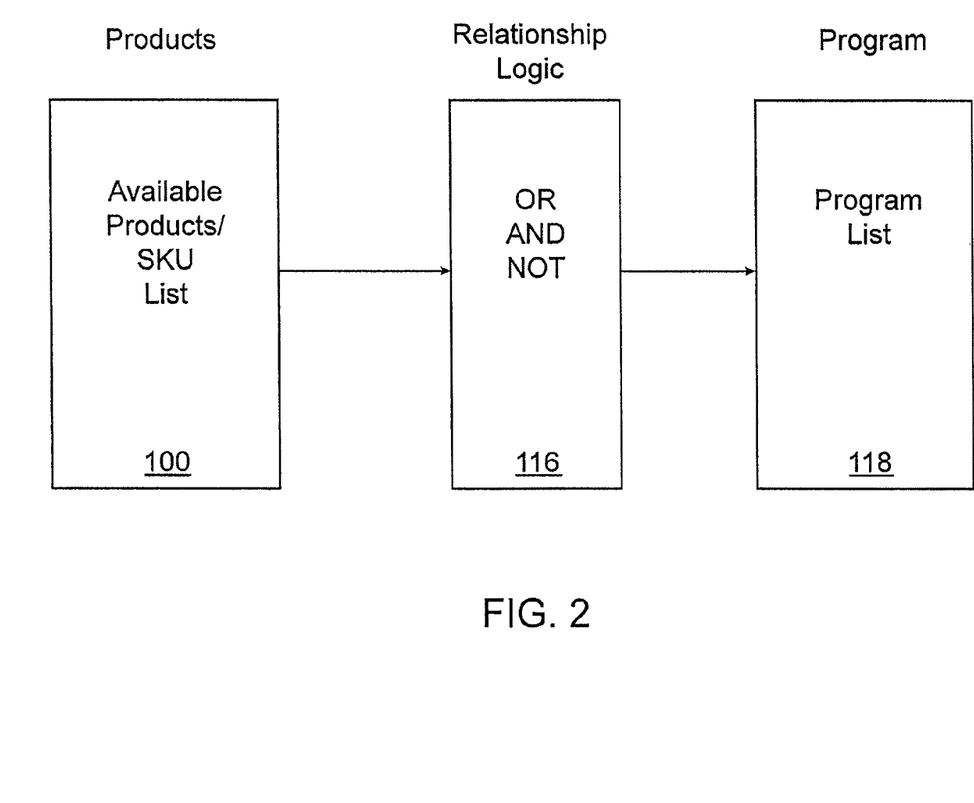
FIG. 2 shows a block diagram of some components that could be used in a GUI (graphical user interface).

FIG. 2 shows a block diagram of features that might be used in embodiments of the invention. A GUI (graphical user interface) can be created by those of ordinary skill in the art using these features and/or other features. Block 110 includes a list of products with corresponding SKUs (stock keeping units). Block 116, shows "or", "and", or "not" logic that can be selected by a user to link different programs. Group lists satisfying the logic in block 116 are represented by block 118. Suitable object-relationship software tools to perform these functions are known to those of ordinary skill in the art.

The combination reward program may be used in a system that automatically monitors and records a consumer's purchases, and then provides the combination reward when the appropriate combination reward trigger is satisfied. A system according to an embodiment of the invention may include a server computer, an access device, and a communication medium. In some embodiments, a physical point of sale device may be in communication with a host server computer operated by a particular merchant via a communication medium such as the Internet. A central body (e.g., a merchant organization) can establish reward program parameters and can provide a facility for merchants and other participants to download such parameters and terms and conditions to each card acceptance device (CAD). In other embodiments, a consumer can use a portable consumer device with a card acceptance device (CAD) that is offline, and is not in communication with a host server computer.

Figure 3:
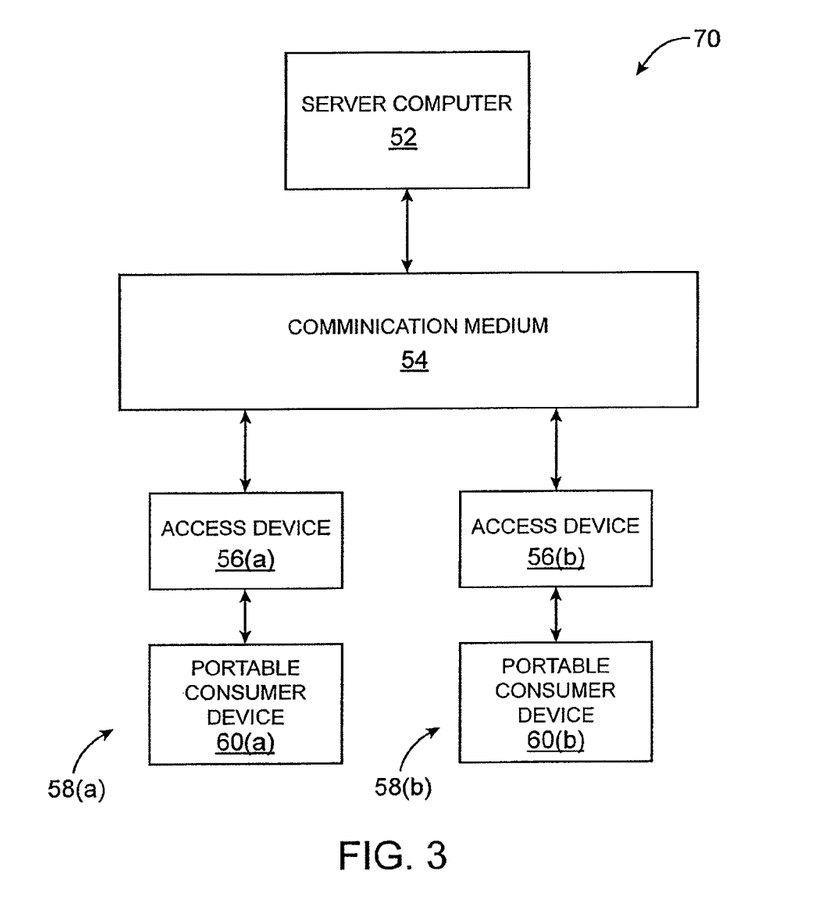
FIG. 3 shows a system according to an embodiment of the invention.

FIG. 3 shows a block diagram of a system 70 according to an embodiment of the invention. The system 70 includes a server computer 52 coupled to access devices 56(*a*), 56(*b*) via a communication medium 54. The communication medium 54 may include any suitable electronic data communication medium including wired and/or wireless links. The communication medium 54 may include the Internet.

Computer terminals (not shown) such as personal computers may be between the access devices 56(*a*), 56(*b*) and the communication medium 54. The access devices 56(*a*), 56(*b*) may be card access devices (CADS) and are respectively at different points of sale 58(*a*), 58(*b*). The different points of sale 58(*a*), 58(*b*) may include, for example, cash registers in stores, kiosks, etc. Two points of sale 58(*a*), 58(*b*) are shown for simplicity of illustration, and embodiments of the invention can have many more points of sale, access devices, etc. The server computer 52 may run a website for a merchant or for an organization associated with the merchant (e.g., a credit card company).

The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

The server computer 52 is typically a powerful computer or cluster of computers. For example, the server computer 52 can be a large mainframe, a minicomputer cluster, or a group of servers functioning as a unit. In one example, the server computer 52 may be a database server coupled to a web server. Moreover, the server computer 52 can behave as a single computer, which services the requests of one or more client computers coupled to or incorporated in the access devices 56(*a*), 56(*b*).

At each point of sale 58(*a*), 58(*b*), each consumer can use a portable consumer device 60(*a*), 60(*b*), which can engage an access device 56(*a*), 56(*b*). For example, the access devices 56(*a*), 56(*b*) may be card access devices, and the portable consumer devices 60(*a*), 60(*b*) may be smart cards. The smart cards can be inserted into or pass through a portion of the access devices 56(*a*), 56(*b*) to engage them. Each access device 56(*a*), 56(*b*) can read or write data to a computer readable medium in a portable consumer device 60(a), 60(b). Such data may include information about past purchases, so that determinations about combination rewards can be made.

Each portable consumer device 60(a), 60(b) can be uniquely associated with a different consumer. For example, each portable consumer device 60(a), 60(b) could be a smart card that is used by a particular consumer. Each portable consumer device 60(a), 60(b) may have data specifically associated with each consumer on it. For example, each portable consumer device 60 may be embossed with a consumer's account number, a consumer's name, etc. This information can also be stored electronically in the portable consumer device 60.

The portable consumer devices 60(a), 60(b) according to embodiments of the invention may be in any suitable form. For example, the portable consumer devices can be hand-held and compact so that they can fit into a consumer's wallet and/or pocket (e.g., pocket-sized). For example, the portable consumer devices may include smart cards, ordinary credit or debit cards (with a magnetic strip and without a microprocessor), a keychain device (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like.

Preferably, the portable consumer devices 60(a), 60(b) are smart cards. A "smart card" generally refers to a wallet-sized card that includes a microprocessor or microcontroller to store and manage data within the card. A typical smart card includes a microprocessor embedded within or on a planar plastic body that is electrically connected to external electrical contacts on the smart card's exterior. The smart card may also include a computer readable medium such as a programmable read only memory (EEPROM) for storing consumer data. Other computer readable media such as ROM (read only memory) or RAM (random access memory) chips may also be included in the smart card. A ROM chip can be used to store a card operating system. A RAM chip can be used for temporarily storing data in the smart card. Any of these examples of computer readable media may be electrically coupled to the microprocessor.

Software applications, including the combination reward programs described herein, may reside in or provide support to the access devices 56(a), 56(b) or a website run on the server computer 52. The software applications may be created using any suitable programming language. A set of variable parameters can be used by an application residing on the access devices 56(a), 56(b) or the server computer 52 to determine when rewards are accumulated or redeemed if a qualifying purchase transaction is conducted by a consumer. These parameters can be downloaded and updated from a central host system including the server computer 52.

Another software component that can be included in the system 70 is within an applet (or other type of program) stored on the portable consumer device 60(a), 60(b) (e.g., smart card, etc.). This component includes a dynamic data field that is updated each time the corresponding rewards programs accumulate or redeem a reward. This component can also be modified or updated based on consumer identification of product preferences (via a separate software application and card access device (CAD) connected to a kiosk or other computer). These values represent past behaviors and specific consumer product preferences that can be used to customize future reward redemption and accumulation.

Figure 4:
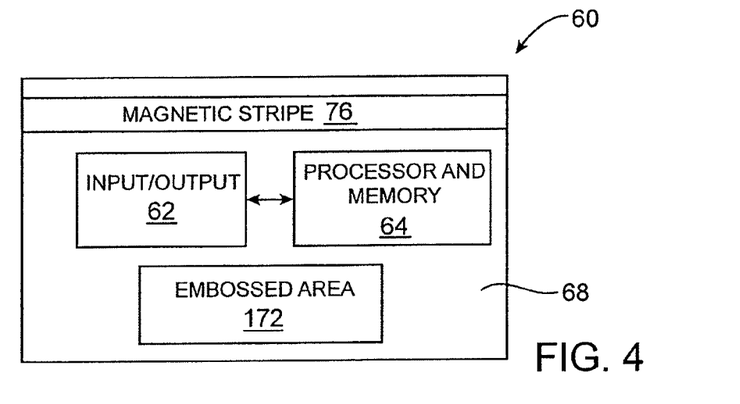
FIG. 4 shows a block diagram of a smart card according to an embodiment of the invention.

A schematic diagram of a portable consumer device 60 in the form of a smart card is shown in FIG. 4. FIG. 4 shows a portable consumer device 60 including a body 68 comprising plastic. The body 68 may be planar and supports a processor and memory 64 as well as input/output terminals 62. The processor and memory 64 may be embedded in or mounted on the body 68. The input/output terminals 62 provide data input and output to the processor and memory 64. An embossed area 172 is also in the body 68 and may include the consumer's name, expiration date of the portable consumer device 60, etc. A magnetic stripe 76 like those found in ordinary credit cards may also be present in the portable consumer device 76. The magnetic stripe 76 and/or the memory in the processor and memory 64 may constitute a computer readable medium. If the portable consumer device 76 is a smart card, it may store financial or identification information, and may be a device that conforms to ISO standard 7816, or other smart card standard.

Using the system shown in FIG. 3 and optionally the smart card shown in FIG. 4, a consumer can receive the combination rewards described herein automatically when a portable consumer device is used. For example, referring to FIG. 3, the two point of sales 58(a), 58(b) may be two different retailers, Retailers F and G. Both access devices 56(a), 56(b) can include a combination reward program that provides an enhanced reward for buying Products C and D. When a consumer engages the smart card 60 with a first access device 56(a) at Retailer F to buy Product C, the access device 56(a) can send the purchase information to the server computer 52 and optionally down to the second access device 56(b). The purchase information could alternatively or additionally be stored on the smart card 60. When the consumer engages the smart card 60 with the second access device 56(b) to buy Product D, the access device 56(b) can provide a combination reward for the consumer. The prior purchase information of Product C can be retrieved from the server computer 52 if it is not already downloaded to the second access device 56(b), or if it is not stored on the smart card 60. The combination reward may be provided to the consumer automatically via a reduction in price or in the form of an electronic coupon at point of sale 58(b) associated with Retailer G. If the combination reward is in the form of a coupon, the consumer may use the coupon at Retailer G or at another specified retailer.

A number of specific examples are provided below.

EXAMPLES

Example 1

Figure 5:
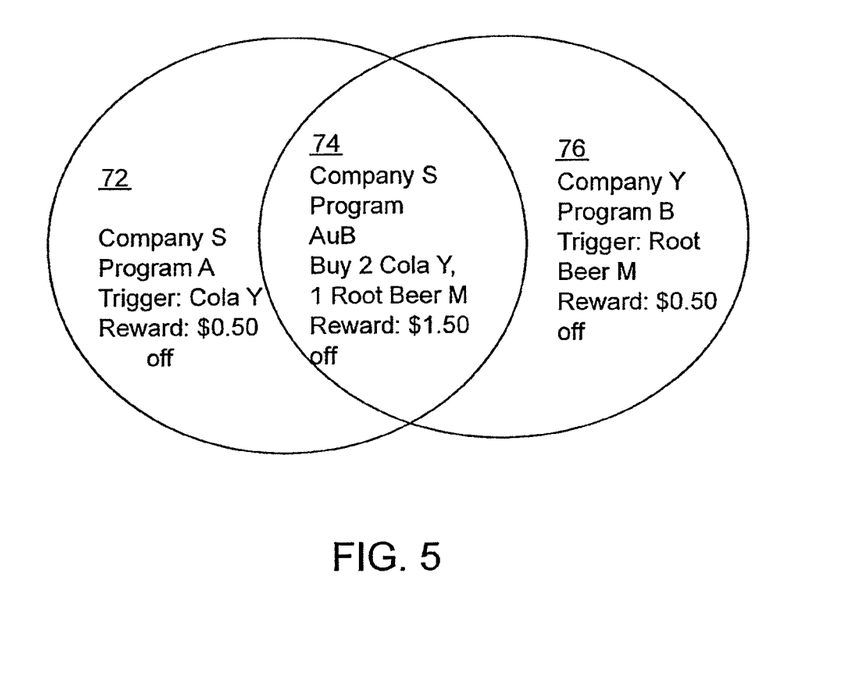
FIG. 5 shows a Venn diagram showing the different, but related programs that can be used in embodiments of the invention.

Referring to FIG. 5, programs A and B (72, 76) are separate programs operated by Company S. Company S makes Cola Y and Root Beer M. Program A rewards $0.50 for each Cola Y purchased. Program B rewards $0.50 for each Root Beer M purchased. Program AuB (74) links program A to program B and increases the minimum trigger to two Cola Ys and one Root Beer M. The combination reward also increases to $1.50. Without the linked Program AuB (74), the maximum reward would have been $1.00 ($0.50+$0.50). Program AuB allows a cardholder or consumer to save more by purchasing more.

Example 2

Figure 6:
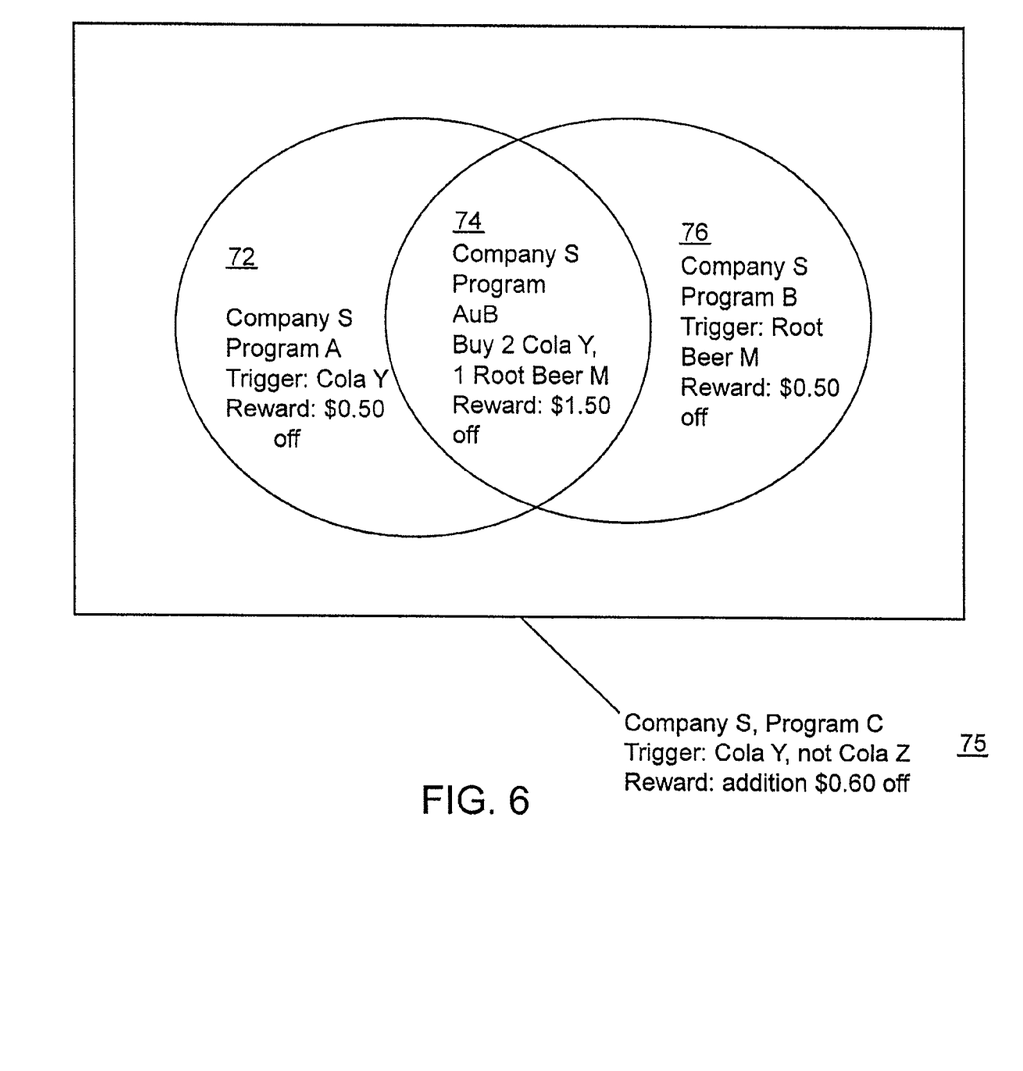
FIG. 6 shows a Venn diagram and a box indicating that a reward will be reduced if a certain product is purchased.

FIG. 6 shows a variation on the programs illustrated in Example 1 and FIG. 5. Company S has a program C (75) that works in conjunction with program AuB (74) by providing another program 75 that provides a reward of an additional $0.60 for only purchasing products made by Company S, and not Cola Z produced by Company T.

The application of this Boolean example can be applied to many parameters and parameter combinations (such as adding cardholder ID, card groups, programs, Issuer ID, merchant groups, SKUs,) to further segregate and personalize rewards.

The Boolean logic for these complex programs can be converted into a human readable format by translating the new program equations into simple text, which can be printed or displayed to a cardholder. This text defines the new program rules for participating in a program. For example, text that corresponds to this example may be: "[i]n order to qualify for an additional $0.60 reward you must purchase 2 Cola Ys and one Root Beer M; but is null if combined with a purchase of Cola Z."

Example 3

In this example, 3 programs may be combined together to form multiple combination reward programs. Program X belongs to Merchant 1. Program Y belongs to Merchant 2. Program Z belongs to Merchant 3. All Merchants belong to the same loyalty network owned by a host organization (e.g., a credit or debit card company) and want to gain additional synergies from existing Programs X, Y and Z. The host organization links Programs X, Y and Z together to form a new combination reward Program XYZ. The reward value for participating in all three programs is higher than the reward of each individual program combined, thus providing additional incentive to the cardholder to participate in all three programs. The minimum trigger for combination reward Program XYZ is higher than the triggers for each individual program combined and satisfies the Merchants' desire for increased sales volumes.

Figure 7:
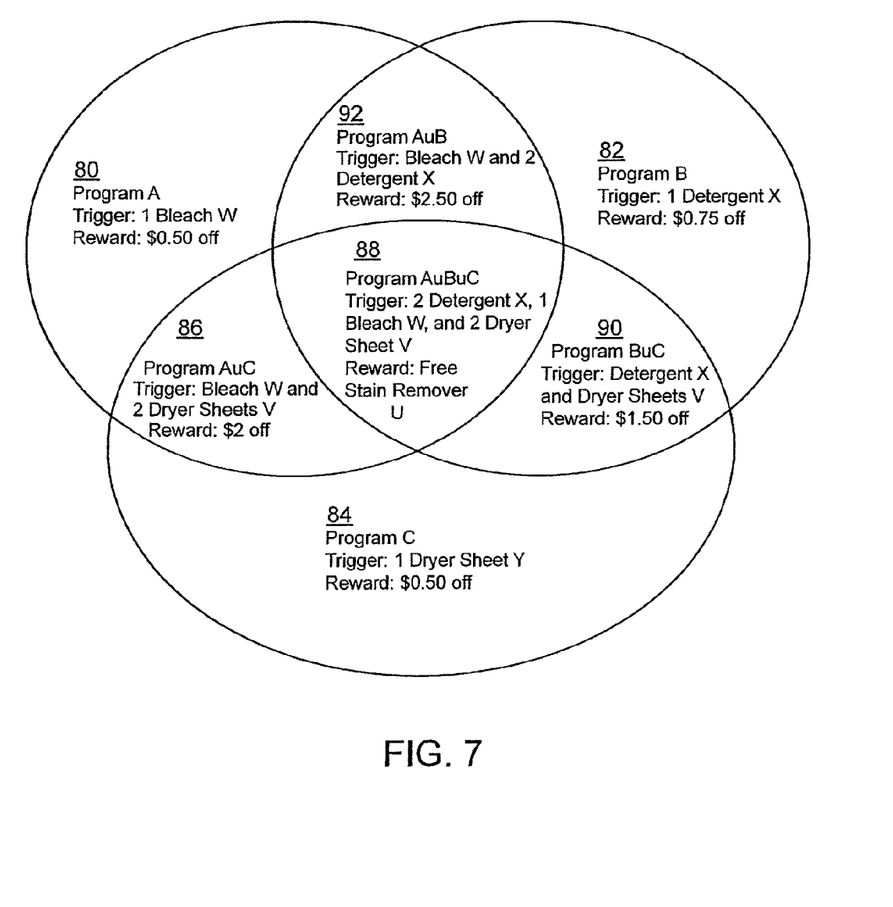
FIG. 7 shows a Venn diagram showing first, second, and third programs and the different combination reward programs that can result from different permutations of the first, second, and third programs.

The use of at least 3 programs with different intersecting combination reward programs can be described with reference to FIG. 7. Referring to FIG. 7, programs A, B, and C (80, 82, and 84) are separate pre-existing programs. The separate programs A, B, and C may be run be three respectively different merchants, or companies. Alternatively, programs A, B, and C can be run by the same merchant or company.

Program A (80) rewards $0.50 for each Bleach W purchased. Program B (82) rewards $0.75 for each Detergent X purchased. Program C (84) provides a reward of $0.50 with the purchase of 1 Dryer Sheet Y.

Programs A, B, and C (80, 82, and 84) can be linked in binary ways to produce combination rewards that are dependent on pre-existing Programs A, B, and C. A combination reward produced and/or any reward trigger from any two of Programs A, B, and C will be greater than the individual rewards/triggers for Programs A, B, and C. For example, Program AuB links Program A to Program B and increases the minimum trigger to 2 Detergent X and 1 Bleach W. The reward for each Detergent X increases from $0.75 to $1.00 for a maximum reward of $2.50. Without the linked Program AuB, the maximum reward would have been $2.00. Program AuB allows cardholder to save more by purchasing more. Similar results are obtained for Programs AuC (86) and BuC (90).

Programs A, B, and C (80, 82, and 84) can also be linked in a trinary way. For example, a Program AuBuC (88) can be linked to pre-existing programs A, B, and C (80, 82, and 84). The trigger for combination reward program for AuBuC (88) is 2 Detergent Xs, 1 Bleach W, and 2 Dryer Sheets V, while the combination reward is a free Stain Remover U. The Stain Remover U reward is greater in value than any of the rewards provided in programs A, B, and C (80, 82, and 84) independently.

In the example shown in FIG. 7, 3 different programs have been linked to create 4 combination programs: AuB, AuC, BuC, and AuBuC. Each binary combination program AuB, AuC, and BuC provides a higher trigger and a higher reward than each individual program A, B, and C. The trinary combination program, AuBuC, provides a greater reward and trigger than each individual program A, B, C, and each binary combination program AuB, AuC, and BuC. This example illustrates that embodiments of the invention can create a greater number of combination programs than individual programs. It also shows that higher-order combination programs (e.g., ternary combination programs) can be created using lower-order combination programs (e.g., binary combination programs).

Example 4

Embodiments of the invention may also provide for rewards that are based on time. For example, a consumer may be encouraged to buy Cola Y and receive a reward. The resulting combination reward (for the purchase of Cola Y and another predetermined product) may be that the end date for all programs will be extended for an additional 30 days.

Additionally or alternatively, there, can be an additional program where a loyal consumer participates in all Programs (AuB)u(1u2), where A, B, 1, and 2 all represent different programs. Preferred consumers (e.g., preferred cardholders) can access to a set of special programs 10 days earlier than consumers who have not satisfied the predetermined combination reward program reward triggers.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

Also, it should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

All references, patent applications, and patents mentioned above are herein incorporated by reference in their entirety for all purposes. None of them are admitted to be prior art to the presently claimed inventions.

What is claimed is:

1. A method comprising:
   receiving information at a host server computer about a first reward program created by a first merchant, wherein the first reward program provides for a first reward when a first product is purchased from the first merchant;
   receiving information at the host server computer about a second reward program created by a second merchant, wherein the second reward program provides a second reward when a second product different from the first product is purchased from the second merchant; and
   using the host server computer, providing for a combination reward program that is linked to the first reward program and the second reward program and that provides a combination reward that is based on the purchase of at least the first product and the second product, wherein the combination reward is given to a consumer in addition to the first reward and the second reward if the consumer purchases the first product and the second product.

2. The method of claim 1, wherein the value of the combination reward is greater than the value of each of the first reward and the second reward.

3. The method of claim 1, wherein the value of the combination reward is greater than the combined value of the first reward and the second reward.

4. The method of claim 1, wherein the combination reward is given to the consumer in addition to the first reward and the second reward if the consumer uses a portable consumer device to purchase both of the first product and the second product.

5. The method of claim 1, wherein the second product is purchased after the first product, and the combination reward is a reduction in price of the second product.

6. The method of claim 1, wherein the combination reward program is based on the purchase of the first product and more than one of the second product, and the combination reward is given to the consumer in addition to the first reward and the second reward if the consumer purchases the first product and more than one of the second product.

7. The method of claim 6, wherein the second reward program provides the second reward for only the first one of second product being purchased from the second merchant.

8. The method of claim 1, wherein the combination reward is given to the consumer in addition to the first reward and the second reward if the consumer purchases the first product and the second product made by the same company.

9. The method of claim 8, wherein the combination reward is void if the consumer purchases a third product made by a different company at the same time as purchasing either the first product or the second product.

10. The method of claim 1, further comprising:
receiving information at a host server computer about a third reward program created by a third merchant, wherein the third reward program provides for a third reward when a third product is purchased from the third merchant.

11. The method of claim 10, wherein the combination reward program is also linked to the third reward program and the combination reward is also based on the purchase of the third product, wherein the combination reward is given to the consumer in addition to the first reward, the second reward, and the third reward if the consumer purchases the first product, the second product, and the third product.

12. The method of claim 11, wherein the combination reward is given to the consumer in addition to the first reward, the second reward, and the third reward if the consumer purchases the first product, the second product, and more than one of the third product.

13. The method of claim 11, wherein the combination reward is given to the consumer in addition to the first reward, the second reward, and the third reward if the consumer purchases the first product, more than one of the second product, and more than one of the third product.

14. A method comprising:
receiving, at a host server computer, information about a first pre-existing reward program created by a first merchant, wherein the first reward program provides for a first reward;
receiving, at the host server computer, information about a second pre-existing reward program created by a second merchant, wherein the second reward program provides a second reward; and
using the host server computer, providing for a combination reward program that provides a combination reward, wherein the combination reward is given to a consumer in addition to the first reward and the second reward if the consumer purchases the first product and the second product.

15. The method of claim 14, wherein the combination reward is given to the consumer in addition to the first reward and the second reward if the consumer uses a portable consumer device to purchase the first product and the second product.

16. The method of claim 15, wherein the portable consumer device includes a dynamic data field that may be updated based on a product preference of the consumer.

17. The method of claim 16, wherein the dynamic data field is updated each time the reward programs accumulate or redeem a reward.

18. The method of claim 15, wherein the portable consumer device includes information about past purchases for facilitating determinations about combination rewards.

19. The method of claim 15 wherein the combination reward program and the portable consumer device are provided by the same host organization.

20. The method of claim 14, further comprising:
reducing or eliminating the combination reward if a third product is purchased.

21. The method of claim 14, further comprising:
receiving information about a third pre-existing reward program for a third product, wherein the third reward program provides a third reward, wherein the combination reward is greater than each of the first reward, the second reward, and the third reward.

22. The method of claim 14, further comprising:
communicating parameters to access devices used by the first merchant and the second merchant to facilitate the sale of the first product and the second product, wherein the parameters enable the access devices to determine when rewards are accumulated or redeemed if a qualifying purchase transaction is conducted by a consumer.

23. The method of claim 14, wherein the combination reward is an extension of time to receive at least one of the first reward and the second reward.

24. The method of claim 14, wherein the combination reward is the ability to access the at least one of the first reward or the second reward at an earlier date.

25. The method of claim 14, wherein the combination reward is a monetary award.

26. The method of claim 14, wherein the first reward program is created by a first merchant, the second reward program is created by a second merchant, and the combination reward program is created by a host organization that is affiliated with both the first merchant and the second merchant.

* * * * *